Figure 1:
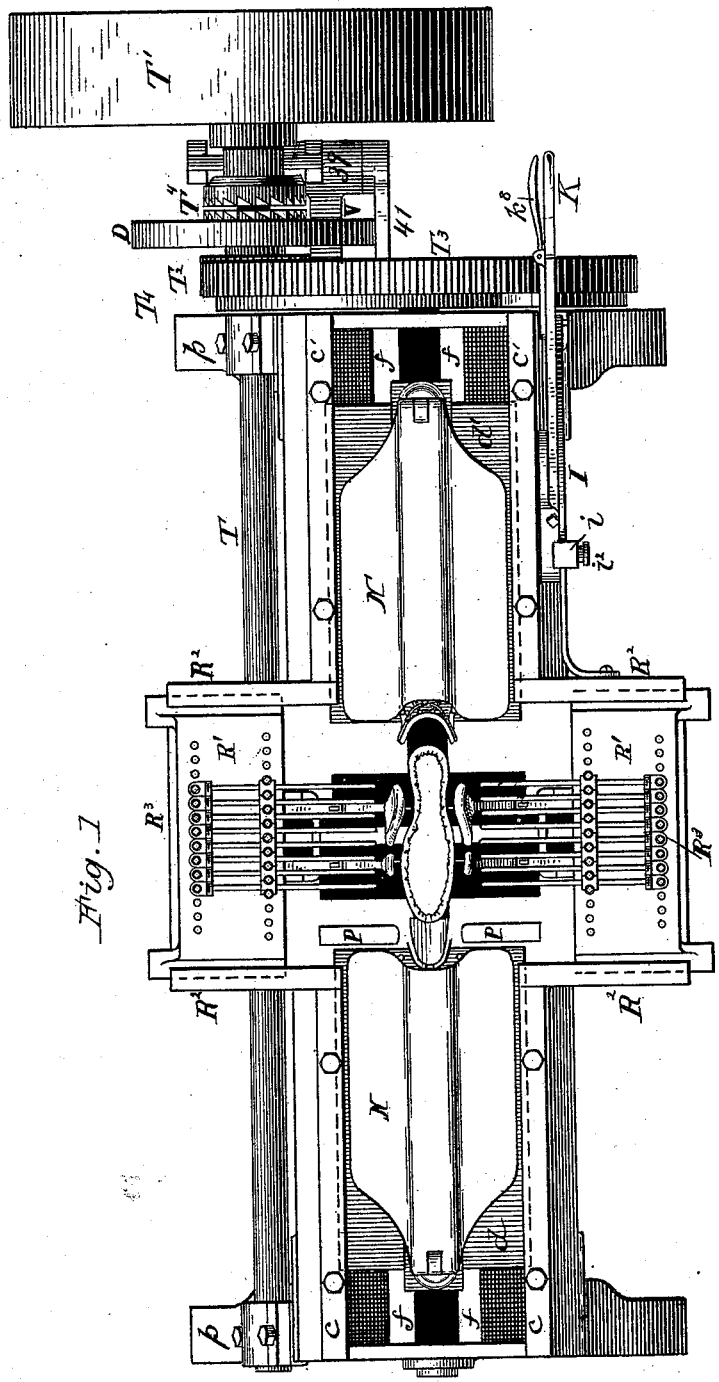

(No Model.) 11 Sheets—Sheet 1.
H. W. DEAN.
LASTING MACHINE.

No. 418,694. Patented Jan. 7, 1890.

Attest:
Nowell Bartle
Walter H. Pumphrey

Inventor:
Henry Wellington Dean
By Johnson & Johnson
His Attorneys.

(No Model.) 11 Sheets—Sheet 3.

H. W. DEAN.
LASTING MACHINE.

No. 418,694. Patented Jan. 7, 1890.

Attest:
Howell Bartle
Walter H. Pumphrey

Inventor:
Henry W. Dean
By Johnson & Johnson
his Attorneys.

(No Model.) 11 Sheets—Sheet 4.
H. W. DEAN.
LASTING MACHINE.
No. 418,694. Patented Jan. 7, 1890.
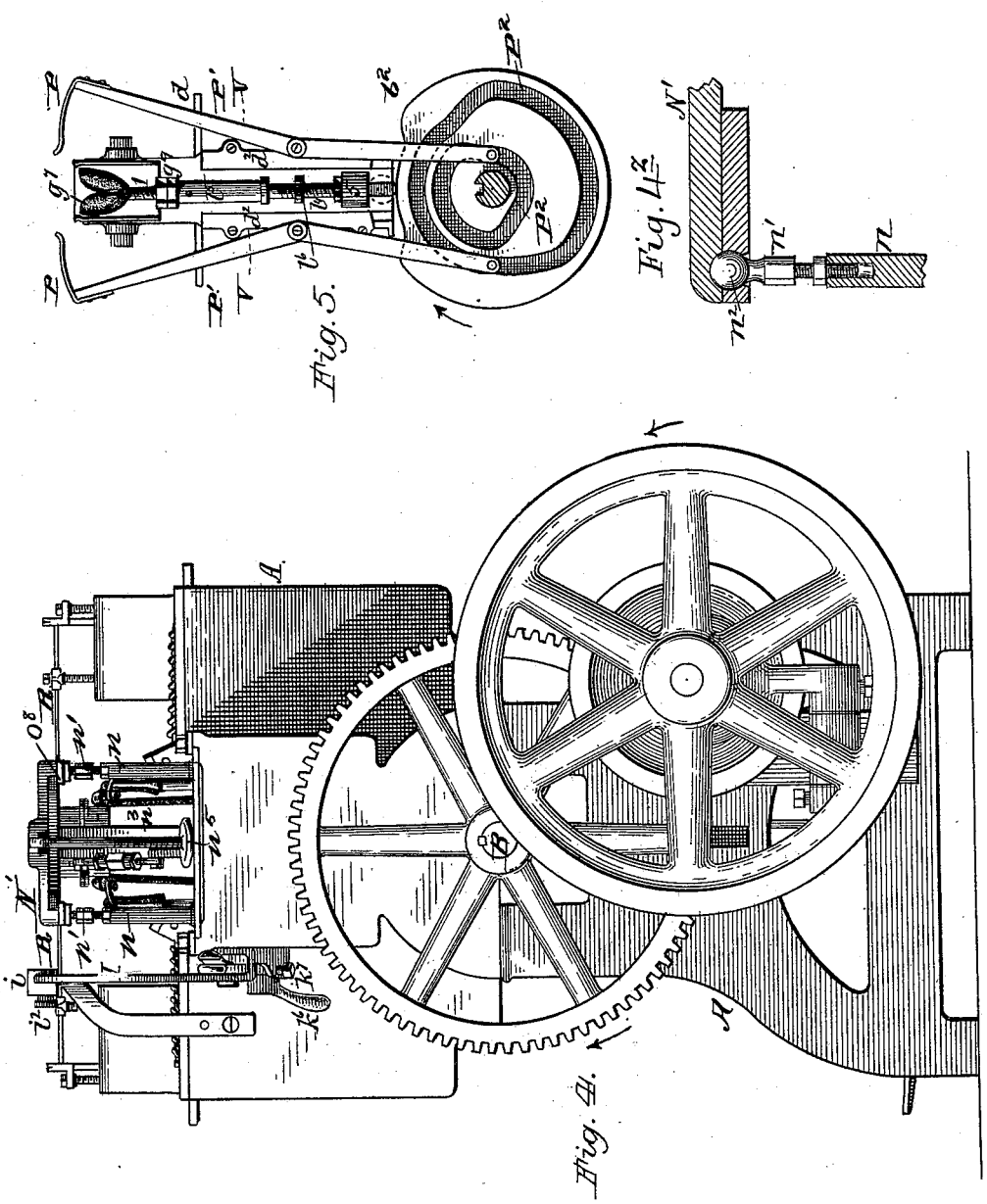

(No Model.) 11 Sheets—Sheet 5.
H. W. DEAN.
LASTING MACHINE.
No. 418,694. Patented Jan. 7, 1890.
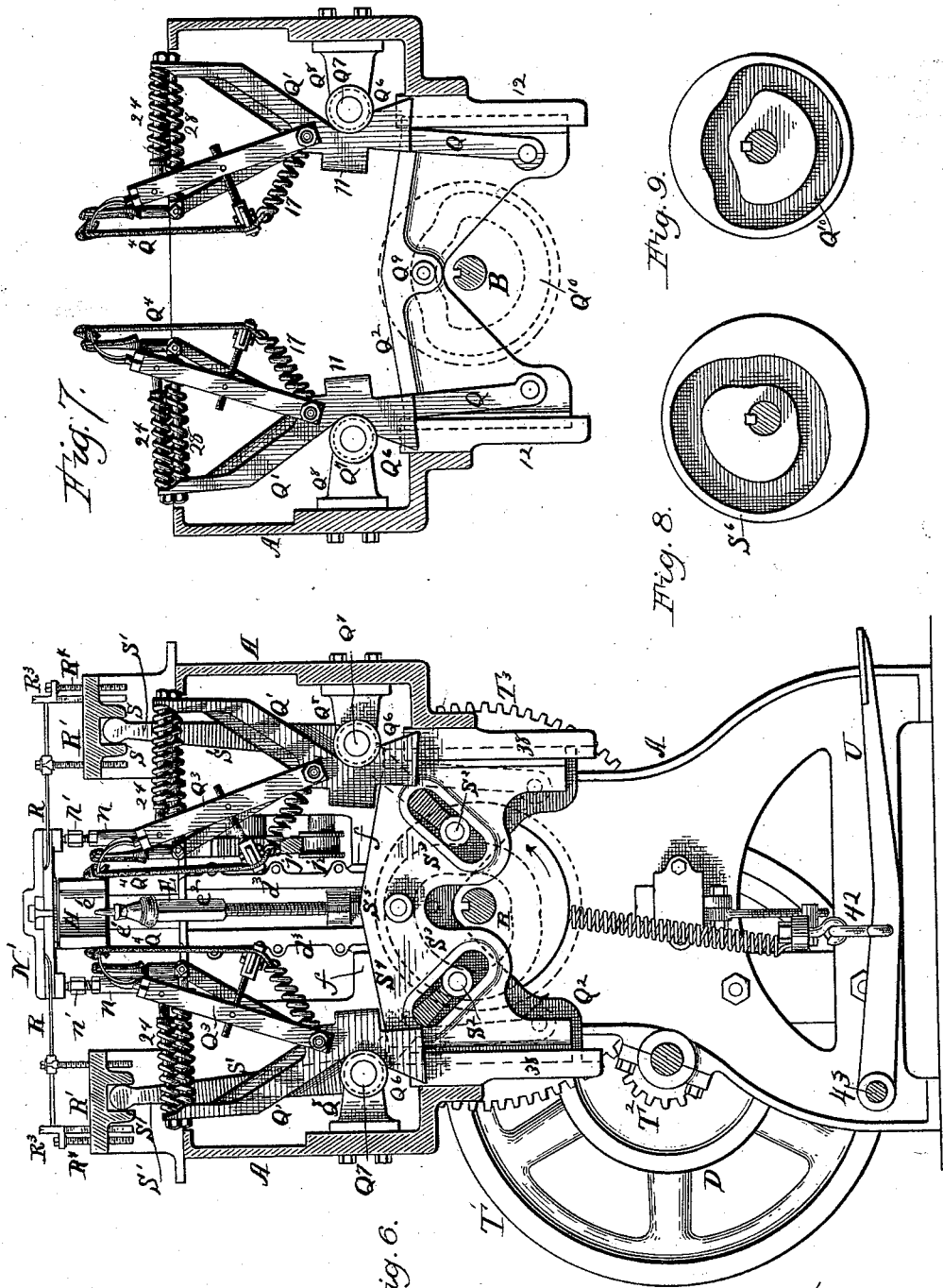

(No Model.) 11 Sheets—Sheet 6.
H. W. DEAN.
LASTING MACHINE.
No. 418,694. Patented Jan. 7, 1890.
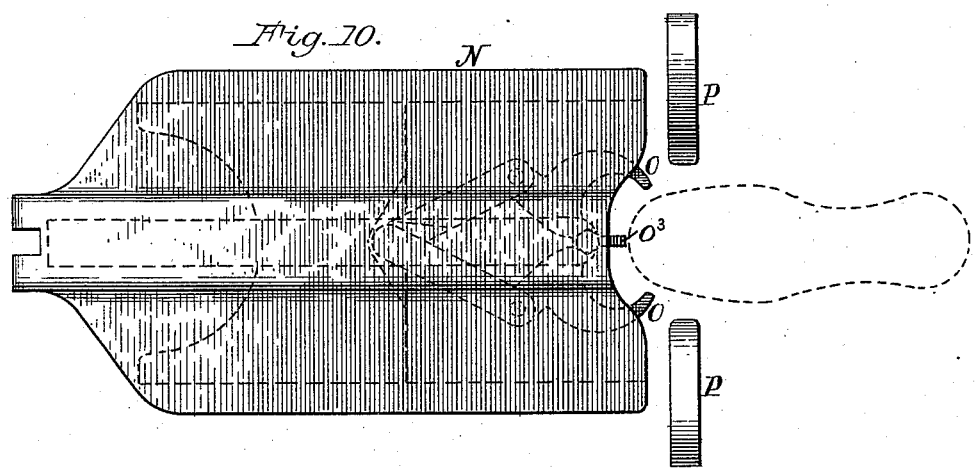
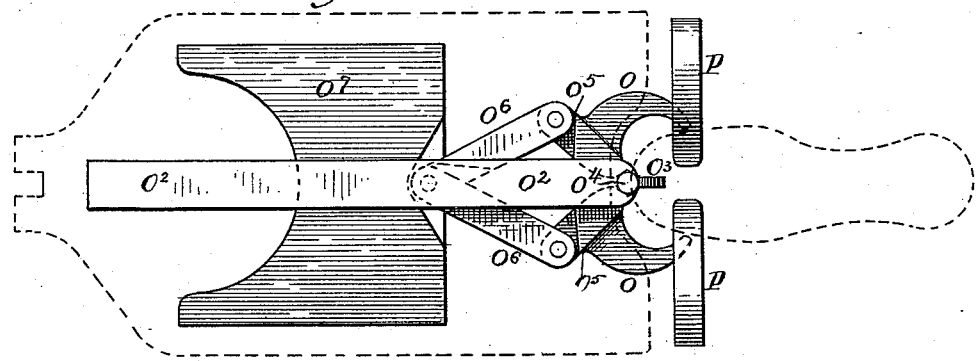
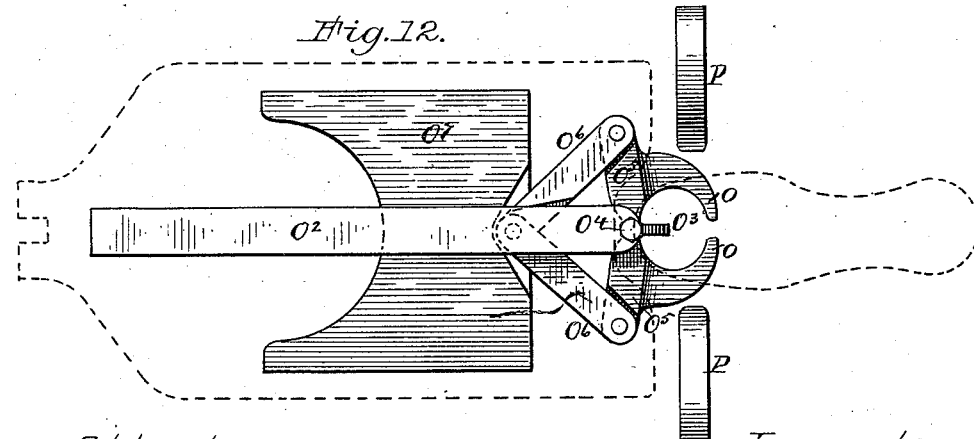

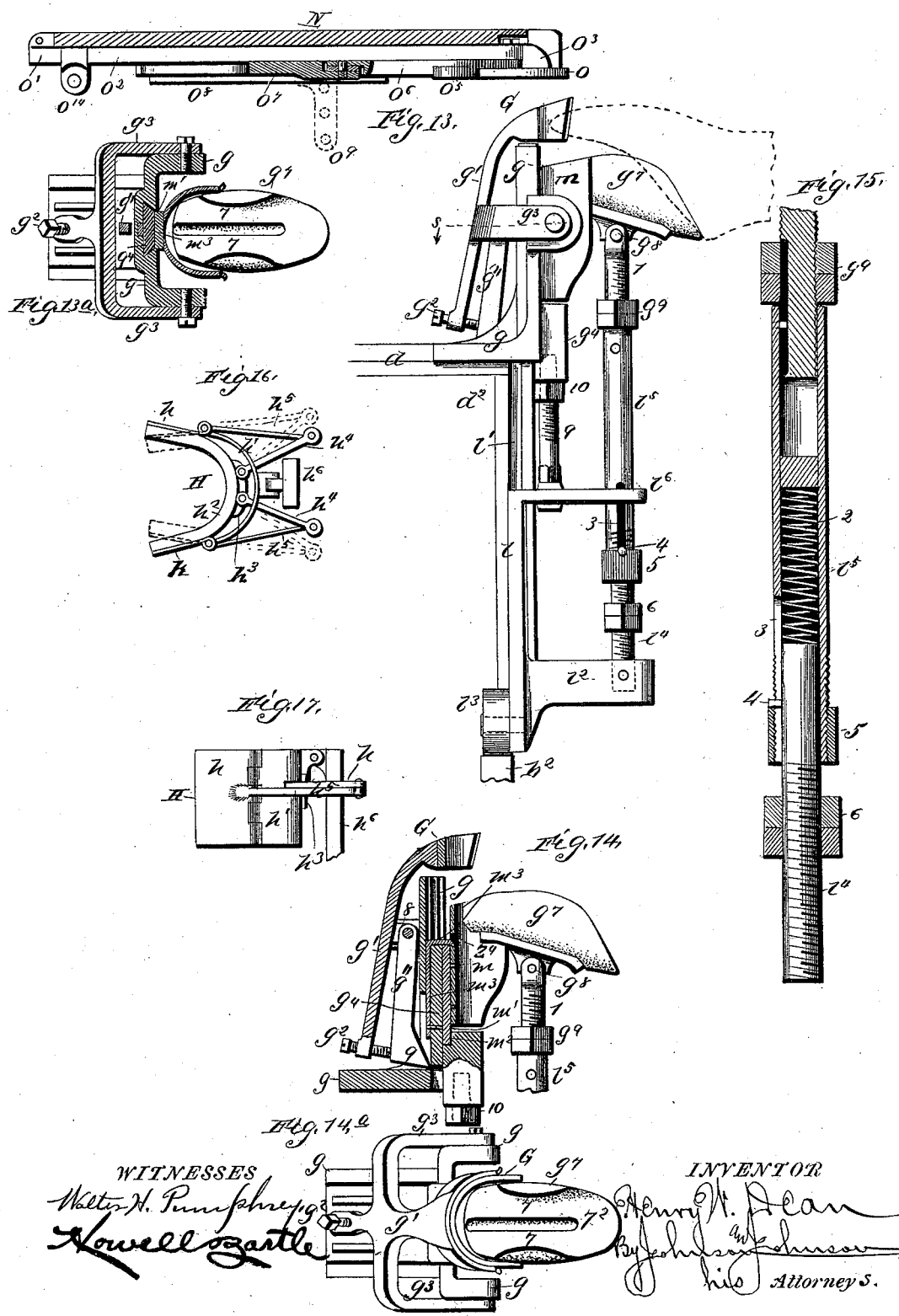

(No Model.) 11 Sheets—Sheet 8.
H. W. DEAN.
LASTING MACHINE.
No. 418,694. Patented Jan. 7, 1890.
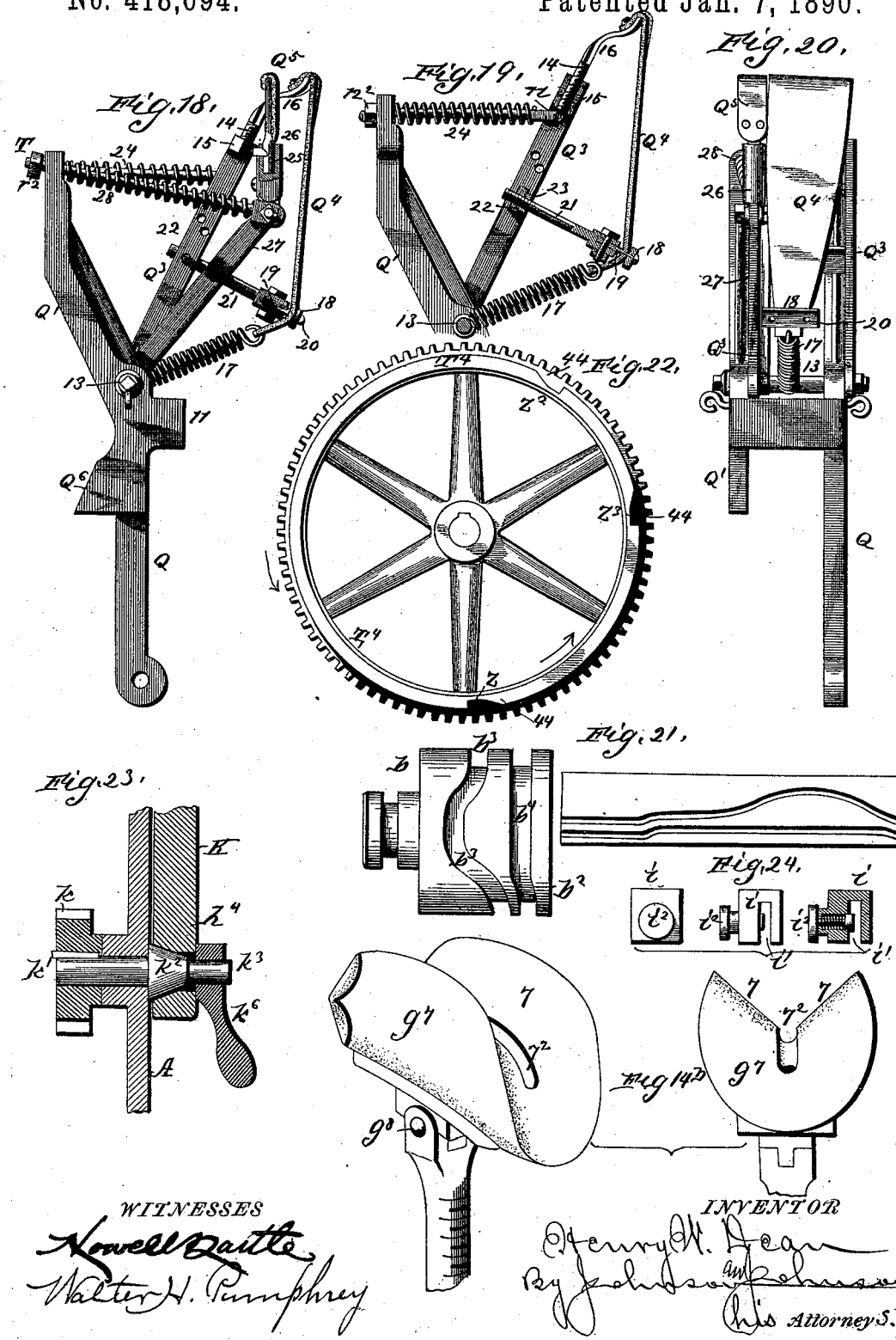

(No Model.)  11 Sheets—Sheet 9.
H. W. DEAN.
LASTING MACHINE.
No. 418,694. Patented Jan. 7, 1890.
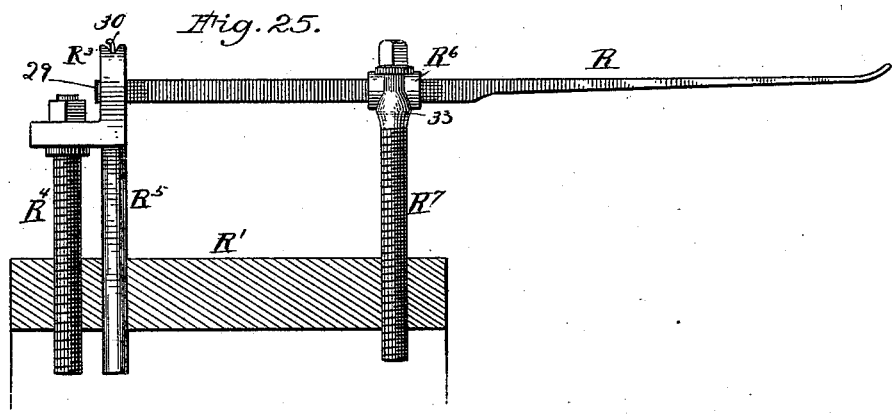
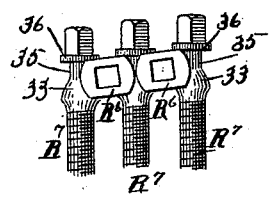
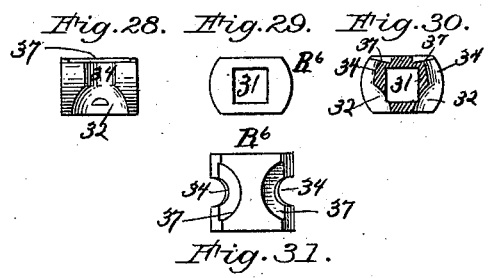

(No Model.) 11 Sheets—Sheet 10.

H. W. DEAN.
LASTING MACHINE.

No. 418,694. Patented Jan. 7, 1890.

Attest:
Howell Bartle
Walter H. Pumphrey

Inventor:
Henry W. Dean
By Johnson & Johnson
his Attorneys.

(No Model.)

11 Sheets—Sheet 11.

H. W. DEAN.
LASTING MACHINE.

No. 418,694. Patented Jan. 7, 1890.

UNITED STATES PATENT OFFICE.

HENRY W. DEAN, OF NORRISTOWN, ASSIGNOR OF PART TO JOHN MUNDELL, OF PHILADELPHIA, PENNSYLVANIA, SIMON A. BUTLER, OF BOSTON, AND EMMA F. LOTHROP AND JOSEPH HERBERT BOWEN, BOTH OF LYNN, MASSACHUSETTS.

LASTING-MACHINE.

SPECIFICATION forming part of Letters Patent No. 418,694, dated January 7, 1890.

Application filed January 28, 1889. Serial No. 297,875. (No model.)

*To all whom it may concern:*

Be it known that I, HENRY WELLINGTON DEAN, a citizen of the United States, residing at Norristown, in the county of Montgomery and State of Pennsylvania, have invented new and useful Improvements in Lasting-Machines, of which the following is a specification.

My invention is directed to the improvement of the machine for lasting shoes for which Letters Patent were granted to me June 9, 1885; and the objects of my present improvements are to produce a better organization of the working parts of the machine, to facilitate the operation, and give better and more satisfactory results in the work.

My improvements are directed to provisions whereby the heel and toe clamps are operated, adjusted, and locked upon the last by a hand-lever to suit the different sizes of lasts, and in which such adjustment is quickly and accurately determined and the operation quickly effected.

My improvements are also directed to provisions whereby, in the several distinct steps of the operation of lasting the upper to the inner sole, there are no two movements that are necessarily completed together, but their operation is made continuous under the control of an automatic stop device and the operator.

I have produced a novel construction of clamp for the heel and for the toe, a novel construction of toe-wiper and toe-rest, and a novel construction of side rubbers or wipers, whereby in their separate and distinct functions the upper is strained and molded perfectly and smoothly over the last. I have produced a novel construction of heel and toe crimping devices, whereby they are caused to operate effectively in laying the edges of the upper over and upon the inner sole. I have produced a novel construction of devices for carrying and adjusting the side-lasting fingers, whereby they are firmly supported and readily adjusted.

I have made improvements in the organization of the complete machine, in its construction, and in its various devices and combinations, whereby the functions, separate and distinct and co-operative, are rendered effective for satisfactory work, all of which I will now describe, and as illustrated in the accompanying drawings, preparatory to a specific designation of the devices and combinations of devices claimed as my invention.

The following is a description of the drawings of my invention as illustrated therein, and as adapted to the forms of mechanism shown.

Figure 2:
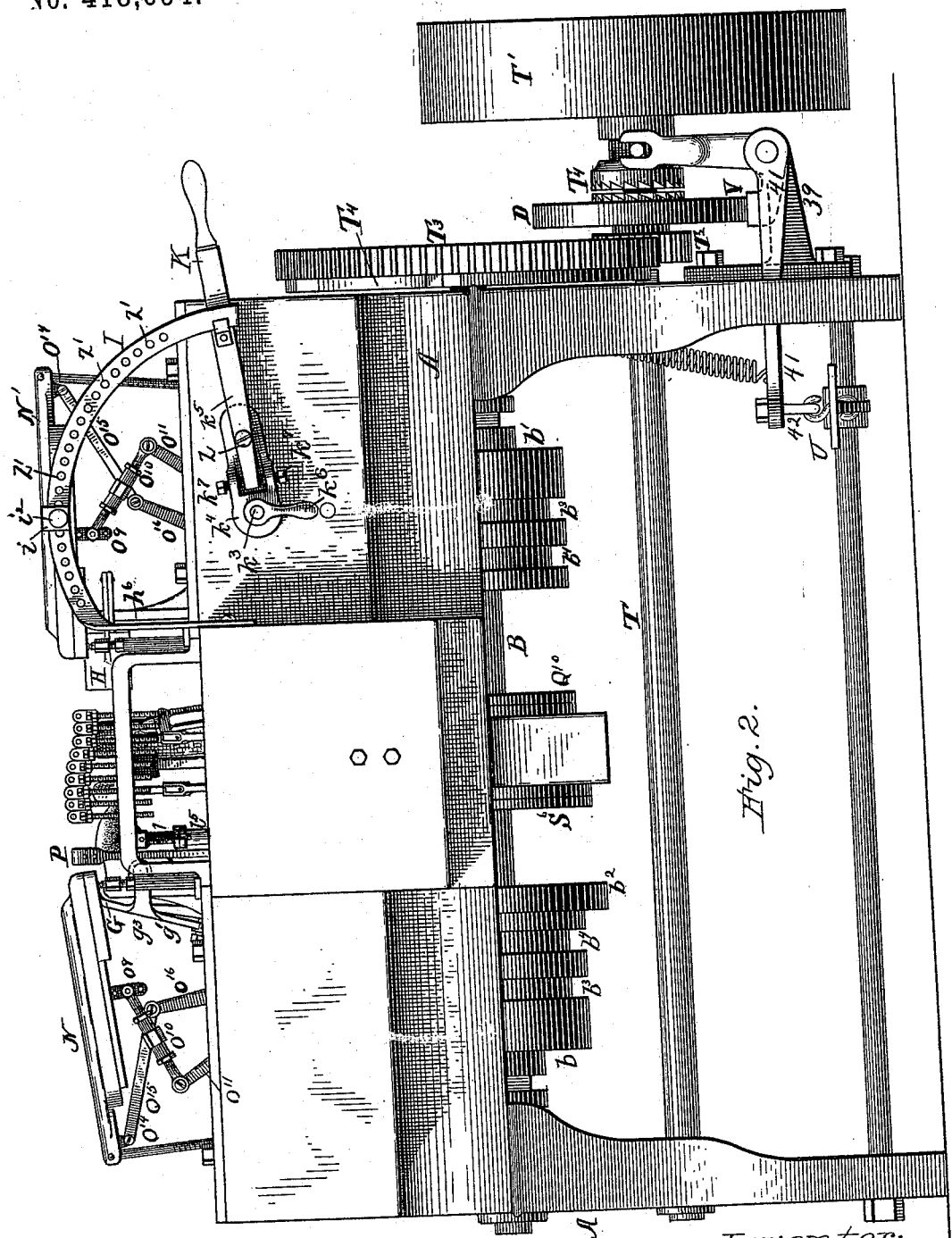
Figure 3:
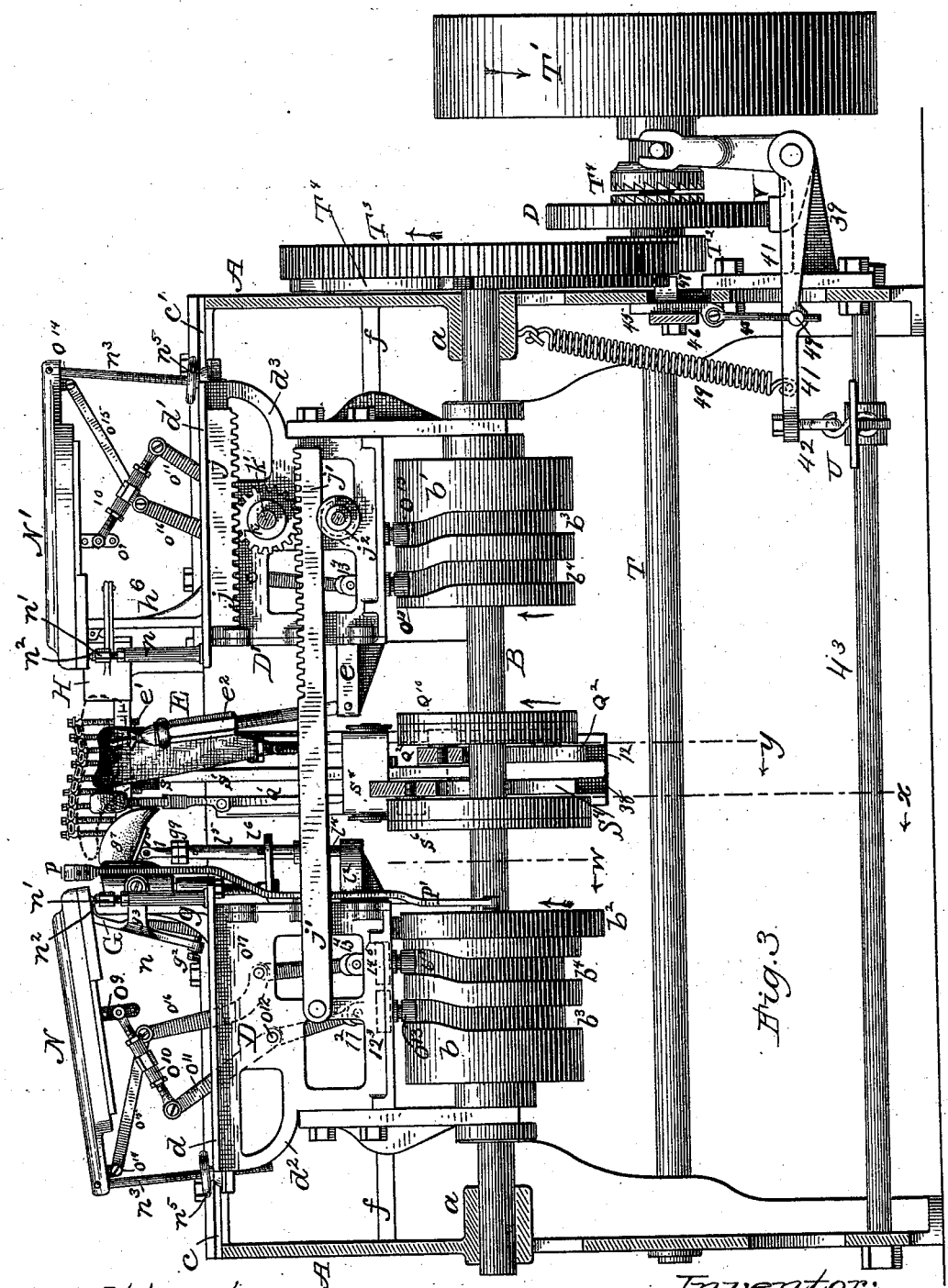
Figure 32:
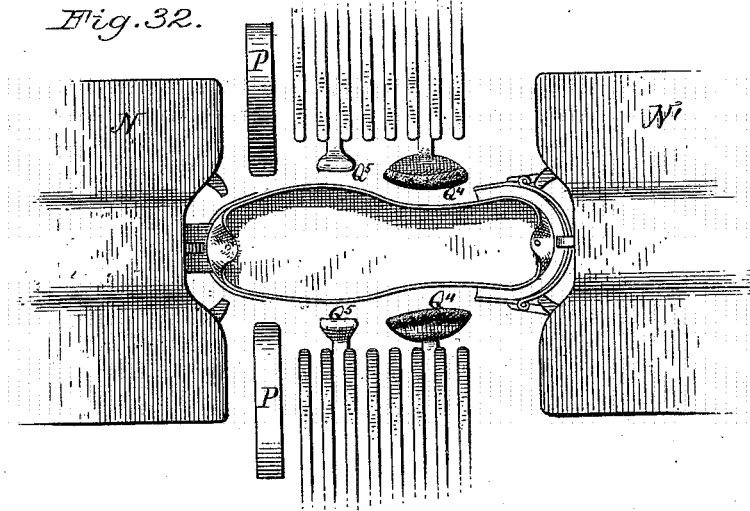

Figure 1 is a top or plan view of a lasting-machine embracing my improvements, the operating parts being in their normal position and the last containing the upper mounted upon the jack. Fig. 2 is a front elevation of the same. Fig. 3 is a partial vertical longitudinal section of the same. Fig. 4 is a view looking at the operating end of the machine. Fig. $4^z$ is a detail sectional view showing the ball-and-socket-supporting connection for the inner end of the top plates, which carry the heel and toe crimping devices. Fig. 5 is a detail vertical sectional view of the auxiliary side toe-lasting fingers and the cam for operating them, the section being taken on the line $w$ of Fig. 3. Fig. 6 is a vertical cross-section of the machine on the line $x$ of Fig. 3. Fig. 7 is a vertical cross-section of a portion of the machine on the line $y$ of Fig. 3, showing the side wipers or rubbers, their cam-operating connections, and the vertically-sliding cross-head, to which they are attached. Fig. 8 shows the cam for operating the side-lasting fingers. Fig. 9 shows the cam for operating the side wipers or rubbers. Fig. 10 shows one of the top plates of the toe-clamp carriage and in dotted lines the toe-crimping fingers beneath said plate in their normal positions after the last has been clamped. Fig. 11 shows in top view the toe-crimping fingers and their operating connections in the positions they occupy after their first movement. Fig. 12 shows in top view the same devices in the positions they occupy just after crimping the leather around the toe and bottom of the last. Fig. 13 is a vertical sectional elevation of the toe-clamp and its operating mechanism and showing the relative position of the toe-crimping fingers, which are carried by the top plate, which is shown in vertical longitudinal section. Fig. 13ᵈ is a horizontal section on the line s s of Fig. 13. Fig. 14 is a vertical longitudinal section of the toe-clamping and supporting mechanism, the toe-rest, and the toe-wiper. Fig. 14ᵃ is a top view of the same, showing the form of the toe-clamp; and Fig. 14ᵇ are views of the toe-rest. (See Sheet 8.) Fig. 15 shows a portion of the adjustable yielding toe-rest support in section, Sheet 7. Fig. 16 illustrates the heel-clamp in top view. Fig. 17 shows the heel-clamp in side view. Figs. 18, 19, and 20, respectively, show in side, section, and front views one of the side wipers or rubbers and its supporting and yielding connections. Fig. 21 particularly shows in side view and in developed plain surface one of the cams which operate the heel and toe crimping fingers. Fig. 22 shows the gear-wheel on the end of the cam-shaft, to particularly illustrate the notched annular rim that engages with the stop-dog of the treadle-operating connections of the machine. Fig. 23 shows a sectional detail view of the connection of the hand-lever with the gear that engages the racks which operate the carriages, upon which the heel and toe clamping and crimping devices are mounted. Fig. 24 in three views shows the stop on the gage-bar, which limits the movement of the hand-lever in the operation of clamping and locking the heel and toe carriages upon the last. Fig. 25 in side view shows one of the side-lasting fingers and its supporting and adjusting screws. Fig. 26 in front view shows two of the supporting-boxes for the side-lasting fingers in connection with the screws for supporting and adjusting said boxes. Fig. 27 shows in vertical sectional detail the manner of securing the outer ends of the lasting-fingers in their bearings. Figs. 28, 29, 30, and 31, respectively show in side, front, vertical cross-section, and top view one of the supporting-sockets or boxes for the side-lasting fingers. Figs. 32, 33, 34, 35, 36, and 37 illustrate the progressive steps in the operation of lasting the upper to receive the tacks.

A suitable frame A is constructed of such form and size as will support the working parts of the organized machine, the cam-shaft B whereof is mounted in bearing-boxes $a$ at each end of the frame. Upon this shaft are splined two cams $b$ $b'$, of like construction, but formed as rights and lefts, adapted to slide freely upon said shaft, to rotate with it, and to operate, respectively, the toe and heel clamping and crimping mechanisms, as will be hereinafter described. At the top of the frame and upon horizontal guideways $c$ $c'$, as seen in Fig. 3, at each end thereof is mounted a carriage D and D', of like construction and adapted to slide upon said guideways coincidently with the sliding movement of the cams upon their shaft. The carriage D at the left carries the toe clamping and crimping mechanism, and the carriage D' at the right carries the heel clamping and crimping mechanism. A top plate $d$ $d'$ and two depending side plates $d^2$ $d^2$ and $d^3$ $d^3$ compose each carriage, the top plates being fitted to slide in the guideways $c$ $c'$ and forming the support for the carriage in the frame, while the depending side plates support the carriage laterally between interior projections $f$ $f$ of the side walls of the frame, as shown in Fig. 6.

Projecting horizontally from the lower inner end of the depending side plates $d^3$ of the carriage D' is a bracket $e$, that has pivotally supported thereon the adjustable last-supporting jack E, upon which the last is primarily supported, as shown in Fig. 3. Pivotally mounted in the upper end of the jack is a stud $e'$, that fits in a hole in the last and is made adjustable by the nut $e^2$.

The last having been placed upon the jack, as shown in dotted lines in Fig. 3, it is clamped between a toe-clamp G, supported upon a vertical bracket $g$, rising from the top plate $d$ of the carriage D, and upon a heel-clamp H, supported upon a bracket $h^6$, rising from the top plate $d'$ of the carriage D', and the clamping is effected by the movement of the carriages D and D' toward the last. The means for effecting these movements of the carriages I will now describe.

Rigidly connected to the under side of the top supporting-plate $d'$ of the carriage D' is a horizontal rack-bar $j$, placed at the outer side of the depending side plate $d^3$, and pivoted to one of the depending side plates $d^2$ of the carriage D is a rack-bar $j'$, that extends over to the carriage D and directly under the rack-bar $j$, the teeth of the said racks extending toward each other. A pinion $k$ is secured upon the inner end of a horizontal stud $k'$, rotatively mounted in bearings in the side wall of the machine, between the rack-bars, as shown in Figs. 3, 6, and 23, and this pinion $k$ is operated by a hand-lever K, (seen in Fig. 2,) so as to give a uniform reciprocating movement in opposite directions to the rack-bars and through them to the carriages D D' to carry the toe and the heel clamps toward the last, and thus clamp the same and to carry them away from the last after the shoe has been lasted.

The free end of the rack-bar $j'$ is supported upon a roll $j^2$, mounted on the inner wall of the frame, so as to maintain it in gear with the said lever-pinion $k$. This pinion-stud $k'$ has at its outer end a conical hub $k^2$, which terminates in a screw-threaded stem $k^3$ at the outer side of the frame, the taper of said hub standing outward and upon which is mounted the hand-lever K. This hand-lever K is composed of two parts $k^4$ and $k^5$, and the part $k^4$ has a conical bearing that fits the conical hub $k^2$, and is frictionally clamped thereon by a nut $k^6$ upon the screw-stem $k^3$, thus tightly locking the pinion and the hand-lever together. This way of connecting the hand-lever with the pinion $k$ admits of the proper adjustment of the carriages with relation to each other and to the last, and also with relation to a gage I, fixed on the frame, by which the heel and toe clamps are locked when clamped upon the last.

The part $k^5$ of the hand-lever is pivotally connected to the part $k^4$ by means of a screw $z$, and it will be seen that the part $k^5$ extends beyond the pivotal connection and is engaged by adjusting-screws $k^7$ in lugs upon the part $k^4$, so as to abut against the opposite sides of the extended end of the lever part $k^5$, and thus allow of a finer adjustment of the hand-lever with relation to the gage I and its adjustable stop $i$ than could be effected by the frictional conical bearing previously described. This gage $i$, as shown in Fig. 2, is composed of a segmental strip of metal placed upon the frame in the path of the hand-lever, and is provided with a series of holes $z'$, that are engaged by a spring-latch $k^8$, Fig. 1, upon the outer end of the hand-lever, and so hold it in a desired position. These holes in the gage are so spaced with relation to each other that the movement of the lever from one hole to another would move the toe and heel clamps just far enough to clamp the next half-size last—that is, the holes are graduated to half sizes of lasts.

To enable the operator to carry the clamping-lever to the proper hole in the gage to clamp the size of last he may be using, I have provided an adjustable stop-block $i$. (Shown in Figs. 1 and 2 and in detail in Fig. 24.) This stop may be of any suitable form, but, as shown, it is a block of metal provided with a slot $i'$, to fit over the gage I, and is provided with a spring-pin $i^2$, to engage with the holes in the gage, and is released from said hole by pulling the knob. The lever can be moved anywhere upon the gage that it may be desired to stop it for the particular size of last in the machine.

Referring now to the heel-clamp H, as shown in Figs. 16 and 17 in detail, it is composed of two metal side plates $h$, hinged to a rear plate $h'$, bent to conform to the heel of the last. Fastened upon the inner sides of the side plates $h$ and extending around the inner surface of the rear plate $h'$, but at some distance therefrom, is a rubber cushion $h^2$, against which the heel of the last is clamped. At the rear side of this rubber cushion $h^2$ is fastened a metal plate $h^3$, having pivoted thereto two arms $h^4$, which extend through a slot in the rear plate $h'$, and which are pivoted to arms $h^5$, rigidly fastened to the plates $h$. When, therefore, the clamp is pressed against the heel of the last, the cushion $h^2$ will be forced back toward the rear plate $h'$, and by means of the pivoted arms $h^4$ and the rigid arms $h^5$ the side plates $h$ will be forced in toward the last and thereby conform the counter and heel to the shape of the last, as shown by dotted lines in Fig. 16.

As a provision for allowing the clamp to adjust itself to the heel of the last, it is pivotally mounted on the bracket $h^6$, as seen in Fig. 17.

The toe-clamp G, previously described as being pivotally mounted upon the bracket $g$, is shown in detail in Figs. 13, 14, and 14$^a$, is composed of a metal bar $g'$, bent over at its upper end and formed into a semicircular widened part G, to engage with the toe of the last. At its lower end it is provided with an adjusting-screw $g^2$, by which pressure on the toe of the last is produced and regulated, and at or near the middle of its length it is provided with two arms $g^3$, which embrace the said bracket $g$ and by which said bar $g'$ is pivoted thereto.

Referring to Fig. 13, it will be seen that at the inner ends of the depending side plates $d^2$ of the carriage D, and between them, is fitted a vertical slide $l$ in grooves $l'$ in said plates, which has a horizontally-projecting bracket $l^2$. The opposite side of said slide $l$ at its lower end is provided with a roll $l^3$, that engages with a cam $b^2$ and by which it is raised. It falls by its gravity. Mounted on the bracket $l^2$ is a short screw-stud $l^4$, and telescoping with said stud is a tube $l^5$, which passes through a guide-arm $l^6$, extending from the upper end of the slide $l$, and in the upper end of this tube is fitted the supporting screw-stem 1 of the toe-rest $g^7$. The tube $l^5$ contains a spring 2, by which it has a yielding support upon the screw-stud $l^4$, as seen in Fig. 15. This tube is provided with a vertical slot 3 at its lower end to receive a pin 4 on the screw-stud $l^4$, whereby the tube is held in proper relation to the screw-stud against the force of the spring tending to separate them. This relation is maintained by a screw-sleeve 5 on the lower end of the tube $l^5$, and the pin 4, abutting against said sleeve, so as to allow this tube to yield under the action of the toe-rest when the slide $l$ is raised. The limit of the yielding movement of the tube $l^5$ is determined by lock-nuts 6 on the screw-stud $l^4$, and the tension of the spring is adjusted by sleeve 5. The toe-rest is pivotally connected at $g^8$ with its supporting screw-stem 1, so as to allow it to properly adjust itself to the last, and the said screw-stem 1 is provided with lock-nuts $g^9$, by which to support the said screw-stem within the end of the tube $l^5$ and adjust it to the proper height thereon.

The toe-rest is preferably made of rubber, of V shape open at both ends. Its inner sides 7 7 terminate in a longitudinal bottom groove $7^2$, and are slightly convex lengthwise and terminate in a downwardly-inclined concave flaring inner end, as seen in Fig. 14$^b$, so that it will conform to the toe and instep of the last and strain and mold the upper thereon as it is raised against the toe-crimping mechanism, against which the last is firmly held by the pressure of the spring in the tube. At the inner side of the toe-clamping bar $g'$ is pivotally hung, by means of a lug 8, Fig. 14, a tripping-bar $g''$, against the foot of which the adjusting-screw $g^2$ abuts. At its lower end this tripping-bar is formed with a toe-shaped projection 9, that abuts against the inner side of a slide $g^4$, fitted in vertical guides in the inner wall of the bracket $g$, as seen in Figs. 13$^a$ and 14. This slide $g^4$ has an enlarged foot part, which is connected by a screw-post 9 to the arm $l^6$ of the slide $l$, said post entering a screw-tap in the slide-foot, and has a nut 10, by which to adjust the slide $g^4$ in proper relation to the tripping-bar $g''$. Now, by turning the screw $g^2$ the clamping end of the toe-clamp G will be caused to move toward or away from the last, as may be desired to set the toe-clamp to act with more or less force against the last. In the operation of this clamping and tripping device the cam $b^2$ causes the slide $l$ to rise and with it the slide $g^4$, which will free the latter from the toe of the tripping-bar and allow the lower end of the said tripping-bar to swing under the said slide $g^4$ and thereby release the toe-clamp. This releasing of the toe-clamp allows the toe-wiper $m$, which is carried by the slide $g^4$, to rise free of the toe-clamp and to draw the upper tight around the toe of the last, as I will now describe. This toe-wiper $m$ is composed of a thin plate of spring metal, bent to conform to the shape of the last at the toe, but is a little smaller than the toe, so that when it is pressed up around the last it will bear sufficiently tight against the upper to draw it firmly around the last. The edges of the toe-wiper are made slightly rounded or flaring, so as not to scratch or cut the upper. Riveted on the back of the wiper-plate is a strip of metal $m'$, Fig. 13$^a$, that fits in a slot $m^2$, Fig. 14, in the foot of the slide $g^4$, and is held in place by a spring $m^3$, secured upon the slide $g^4$, so that its upper end extends over the said slide and projects through a slot $z^4$ in the back of the wiper, (seen in Fig. 14,) and is slightly hook-bent to take hold of the wiper and retain it in place, while at the same time permitting of its ready removal when a larger or smaller wiper is desired.

Referring to the co-operation of the toe-clamp G and of the toe-rest $q^7$, at the time the latter is raised the toe-clamp is released from its lock and is caused to fall back by gravity due to the manner in which it is hung by its pivot-arms, and in thus falling back at the top it swings forward at its lower end, carrying with it the lower end of its hanging trip-bar $g''$. The relation of the toe-rest support to the toe-clamp is such that the latter is held in position by the co-operation of the toe-rest support and the hanging trip-bar when the toe-rest support is down, and the toe-clamp is released when the toe-rest rises.

In Figs. 13 and 14 the toe-clamp G is shown in its locked clamping position.

Referring now to the toe and heel crimping devices, they are of similar construction and are carried upon the under sides of top plates N and N', which are mounted upon the supporting-plates $d$ and $d'$ of the carriages D and D', as shown more clearly in Figs. 3 and 13, one of said plates being shown in top view in Fig. 10. These top plates are supported for adjustment in relation to the last, as I will now state. The front ends of these top plates are mounted on posts $n$, (see Figs. 3 and 4,) that are provided with adjusting-nuts $n'$, so as to raise and lower said plates to the proper level relatively to the last. The connection of these posts with the top plate is by ball-joint $n^2$, Fig. 4$^x$, so as to allow said plates to be tilted from the rear end so as to bring the crimping-fingers O, carried by said plates, in proper line with the spring of the last. This tilting of the top plates is effected by means of a screw-threaded bar $n^3$, pivotally connected to the outer end of each of the top plates and provided with a hand-screw $n^5$, as seen in Fig. 3, having a bearing upon the supporting-plate of the carriage.

Figure 36:
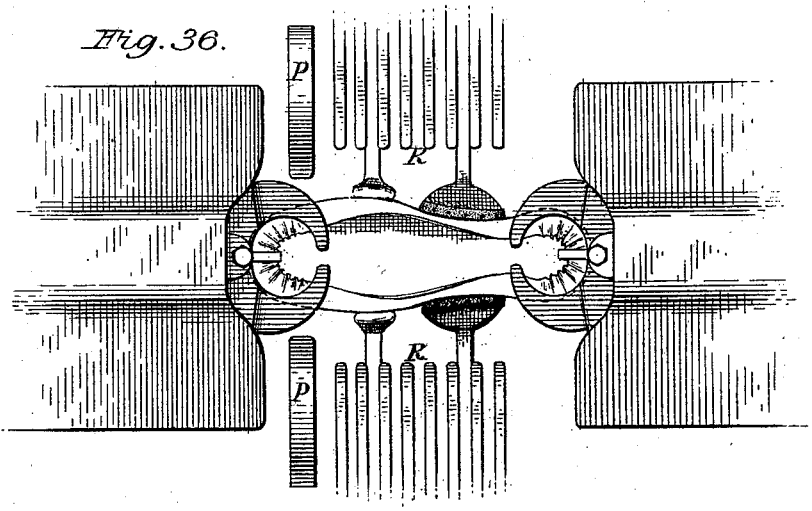
Figure 37:
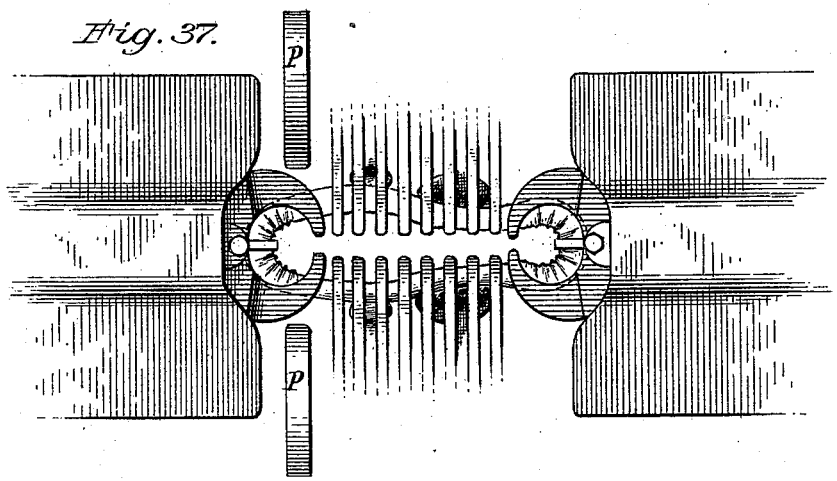

Fitted to slide in a groove $O'$ on the under side of the top plates N and N' is a bar $O^2$, having at its inner end a projecting lug or nose $O^3$, under and against which the last is pressed by the toe-rest $q^7$. Now, looking at Figs. 10, 11, and 12, it will be seen that this bar $O^2$ has pivoted at its inner end, at $O^4$, the crimping-fingers O, which approximate in form to a crescent. These crescent fingers are provided with arms or lugs $O^5$, which are pivoted to links $O^6$, which are at their other ends pivoted together and upon a plate $O^7$, which is fitted to slide in guideways $O^8$ on the under side of the top plate, as seen in Figs. 4 and 13, so that the movement of said plate will cause the fingers to have a sweeping or circular motion over the toe of the last and thereby crimp and lay the leather, as seen in Figs. 36 and 37.

Projecting downward from the under side of the plate $O^7$ of each carriage D and D' is a lug $O^9$, Figs. 2, 3, and 13, to which is pivoted one end of an adjustable link $O^{10}$, the other end of which is pivoted to the upper end of a rocking lever $O^{11}$, which is mounted in vertical position between the depending side plates of the carriages on a cross-stud $O^{12}$. (Seen in Fig. 3.) The lower ends of these levers $O^{11}$ are forked and connected at $11^2$ to a small cross-bar $12^3$, fitted to slide in guideways on the inner walls of the depending side plates $d^2$ of the carriage D, and a roller $O^{13}$, mounted on a short stud on the under side of said cross-bar $12^3$, is adapted to work in the cam-groove $b^3$ of the right and left cams $b$ and $b'$, so that these levers $O^{11}$ operate the said plates $O^7$ of both carriages simultaneously.

The adjustments made by the screw-links $O^{10}$ are to adapt the heel and toe crimping fingers to suit lasts having different widths of heels and toes by increasing or diminishing the extent of the movements of said fingers.

Projecting downward from the outer end of the bar $O^2$ is a lug $O^{14}$, to which is pivoted the upper end of a link $O^{15}$, the other end of which is pivoted to the upper end of a rocking lever $O^{16}$, which, like the lever $O^{11}$, is mounted on a cross-stud $O^{17}$, between the depending side plates of the carriages. The lower ends of these levers $O^{16}$ are forked and connected at $13^4$ to a small cross-bar $14^5$, fitted to slide in guideways on the inner walls of the depending side plates $d^2$ of the carriage D, and a roll $O^{13}$, mounted on a short stud on the under side of said cross-bar $14^5$, is adapted to work in the cam-groove $b^4$ of the right and left cams $b$ and $b'$, so that these levers $O^{16}$ operate the said bars $O^2$ of both carriages simultaneously.

As the structure and operation of the heel and toe crimping mechanisms are identical, it is only necessary to illustrate in detail the crimping devices of one of these mechanisms in their relation to the last, and for this purpose I have shown in enlarged views the toe-crimping devices in Figs. 10, 11, and 12, and the last in dotted lines, in which Fig. 10 shows the crimping-fingers and the slide-bar $O^2$ in their positions when not operated by their respective cams. In Fig. 11 the crimping-fingers and the slide-bar are shown in their first movements together toward the toe of the last to bring the points of the crimping-fingers nearer to each side of the last and the projecting lug or nose of the slide-bar carrying the leather over the toe. In this movement it will be seen that both the cams $b^3$ and $b^4$ operate simultaneously and with the same movement upon both the rocking levers $O^{11}$ and $O^{16}$, and thus move both the slide-bars $O^2$ and the slide-plates $O^7$ together without changing the relative positions of either.

Figure 33:
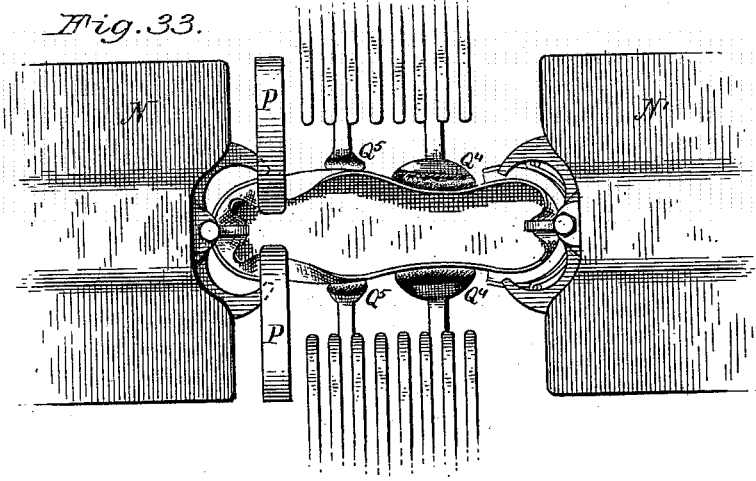

In Fig. 12 the crimping-fingers are shown as having been operated by the forward movement of their connected plate to cause them to sweep with a circular closing movement over the last to crimp and lay the edges of the upper thereon, and to maintain such position during the operation of tacking the shoe. As this closing action of the fingers over the toe upon the edges of the upper are liable to cause puckers at these points and interfere with the smooth laying of the edges, I have provided auxiliary side-lasting fingers P P, (shown in Figs. 1, 5, 10, 12, and 33,) which I will now describe. Referring particularly to Fig. 5, the said fingers are seen as being formed of flat pieces of spring metal, carried upon the upper ends of levers P' P', which are pivotally connected to the inner ends of the depending side plates $d^2$ of the carriage D, and extend down to and connect by rolls with face cam-grooves $P^2$ $P^2$ of like form, and both formed one within the other upon the cam $b^2$ of the cam $b$, and to cause the said fingers to move over the last, as seen in Figs. 11 and 33, just before the crimping-fingers close, and to move away from the last after the crimping-fingers have closed, as seen in Fig. 12. In this preliminary laying movement the side fingers P P are so formed as to allow the crimping-fingers to pass under them. About the same time the closing movements of the crimping-fingers occur, the side rubbers or wipers operate to bring up the upper and draw and strain it over and about the bottom of the last, as I will now describe.

Referring particularly to Figs. 6, 7, 18, 19, and 20, the said wipers or rubbers are shown as being formed of separate and distinct parts used in pairs for each side of the last. They are preferably each formed of a single piece of leather, the part operating upon the hollow or shank sides of the last being wider and longer than the part operating upon the swell of the last; but both are carried by a lever-frame, and the lever-frame of each set is supported and operated simultaneously. These lever-frames I will now describe preparatory to describing the particular means for mounting the rubbers to permit of their yielding and rubbing action. Each lever-frame consists of arms Q Q', connected in pairs about the middle of their length by a cross-bar 11. One of these lever-arms Q is made longer than the other and extends down, and is pivotally connected at its lower end to a cross-head $Q^2$, fitted to slide vertically in guideways 12, fixed to and depending from the sides of the frame of the machine, as seen in Fig. 6. A bolt 13 is mounted in these lever-arms, above their connecting cross-bar 11, and upon this bolt is pivotally mounted the support for the large wiper, and which is preferably made of a U-shaped bar $Q^3$, with its ends loosely mounted upon each end of the said bolt, as seen in Fig. 20. In the upper end of this wiper-support is socketed a screw-stud 14, provided with an adjusting-nut 15, which rests upon the top of this wiper-bar $Q^3$, and rising from this screw-stud 14, and preferably integral with it, is a plate 16, curving over toward the last with a convex edge conforming to the hollow of the last, and having a width suited to the hollow side of the last. Upon and over the upper curved edge of this plate the leather rubber $Q^4$ is riveted, and extends down in a substantially vertical position and slightly tapering from the top, and is secured in a clamp pivotally mounted in the wiper-bars $Q^3$ and stretched by a coil-spring 17, which connects the lower end of the rubber to the cross-bolt 13 of the lever-frame and renders the rubber flexible at every point. The clamp for the lower end of the rubber $Q^4$ is composed of two plates 18 and 19, between which the small end of the rubber is firmly clamped over and upon the edge of the inner plate 19 by screws 20, passing through each end of the outer plate 18 into the edge of the inner plate. This inner plate is secured edgewise in the slotted end of a screw-rod 21, the other end of which is held in a cross-bar 22, loosely mounted in bearings in the sides of the U-shaped wiper-bar Q³, the said screw-rod 21 being supported on said cross-bar by a nut 23, by which the screw-rod can be set out or in. By this means of mounting the wiper it can be adjusted vertically by the screw and nut 14 and 15; it can be adjusted out or in at its lower end by its supporting screw-rod 21; it can yield along its length by reason of the freedom of its supporting screw-rod to rock with its supporting cross-bar in its bearings in the sides of the U-shaped bar, and it is constantly strained over the said rocking support by the pulling action of the spring 17. It is perfectly adapted for different forms and for right and left lasts.

Figure 34:
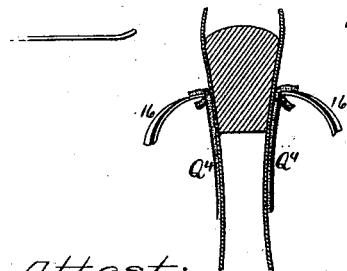
Figure 35:
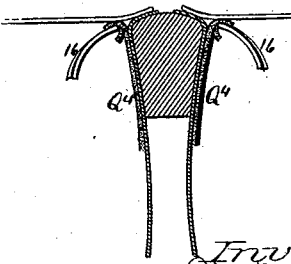

Supplementing the function of the rubber to yield as stated, it is firmly but yieldingly pressed forward and held against the last by a spring 24, extending from the upper end of one of the arms of the lever-frame to the upper end of the U-shaped bar Q³, and supported by a rod $n$ and nut $n^2$, which adjustably connects the rubber-support with the lever-frame. This allows the rubber-support to yield in the arc of a circle upon its bearing-rod 13, while the rubber itself has an independent yielding function, as stated, whereby it is adapted to act with a molding pressure to hold and strain the upper as it is raised in contact with the hollow or shank side of the last. It may be readily replaced when worn out by a new one. Coacting with this flexibly-acting rubber for the shank, I provide a small rubber Q⁵, having a flat and preferably non-yielding surface adapted to operate upon the toe or the swell part of the last. It is formed of a piece of leather riveted to a flat plate provided with a round stem 25, (see Fig. 18,) secured in a socket 26, formed in the upper end of an arm 27, mounted loosely upon the rod 13, and which is constantly pressed forward at its upper end by a spring 28, connecting its upper end to the upper end of one of the arms of the lever-frame, the said spring being supported by a rod T and nut $r^2$, which adjustably connect the arm 27 with the lever-frame. A spring-pin fastens the shank of this small rubber in its socket, so as to permit of its easy removal and replacement. This toe-operating wiper part is mounted so as to set back from the face of the shank-operating wiper part to suit the swell of the last; but they both move so as to act together. In the starting of these wipers they are brought against the sides of the upper, below the top of the last, as seen in Fig. 34, and are carried up a little below the top of the last, as seen in Fig. 35, so as not to interfere with the action of the side-laying fingers, as I will now describe.

Each arm of the lever-frame is formed with a cam $Q^6$, as seen in Figs. 7 and 18, as inclining upward and inward on the outer edges of and about the middle of the length of the arms, so as to act against rolls $Q^7$, which are mounted upon short shafts supported in bearings in the ends of brackets $Q^8$, which extend inward from the inner walls of the opposite sides of the frame. At a point centrally and near the top of the cross-head $Q^2$ is mounted on its side a roll $Q^9$, which works in a cam-groove $Q^{10}$, (shown in Fig. 9 and in dotted lines in Fig. 7,) and which is fixed upon and rotated by the cam-shaft. As seen in this figure, the wipers are in their normal open positions, so that the rotation of the said cam $Q^{10}$ will cause the cross-head $Q^2$ to rise, and simultaneously the cams $Q^6$ of the lever-arms will be caused to ride upon the rolls $Q^7$, and thus force the wipers inward upon the sides of the upper, for the purpose stated. The wiper-arms stand inclined inward from their pivotal connections, so as to overhang their lever carrying-frame and hold the acting wiper-surfaces in vertical positions in relation to the last, and particularly is this important in maintaining the strap-wiper in position to have its upper end act upon the shoe-upper as it is moved inward and upward upon the shoe-upper, so as to stretch and lay the latter well over the edges of the inner sole, and there hold it for the action of the crimping-fingers. This rubbing and smoothing action upon the side of the shoe-upper and upon its upper edges over the edges of the inner sole could not be obtained if the straps were pulled away from the last at their upper ends.

Referring now to the side-lasting fingers R for laying the edges of the upper, and particularly to Figs. 6, 25, and 26, it will be seen that they are arranged upon carriages R' R' at each side of the machine, so as to stand crosswise above the top of the frame, on a level with the bottom of the last, and are moved toward and from the same. These fingers are formed of long narrow pieces of spring metal, arranged in parallel relation, separated a distance about equal to their width and of sufficient number to fill the space over the last between the crimping-fingers when the latter are in their closed positions, as seen in Fig. 37. They are supported at two points upon their carriages, which latter are formed of a horizontal plate and vertical end plates and fitted to slide in ways R² on the top of the frame of the machine, which at this point is made wider than the end portions of the frame, as shown in Fig. 1, so as to accommodate the length of the fingers and the movements of the carriages. These fingers R are supported independent of each other at their outer ends and at the outer side of the carriage by means of L-shaped metal holders R³, the vertical part whereof has a hole within which is snugly fitted the round end 29 of the shank of the finger, where it is fastened by a key 30, pinned in said holder so as to allow the finger to be turned. In the horizontal part of this angle-holder R³ is fastened a screw R⁴, which passes down through a screw-threaded hole in the top of the carriage, and depending from said angle-holder is a guide-stud $R^5$, which passes down through a hole in the top of the carriage. This construction allows the vertical adjustment of the outer end of the finger and keeps the angle-piece in proper relation to the finger. At the inner side of the carriage the fingers are also supported independent of each other by means of sockets or boxes $R^6$, each one placed between two screws and having square openings 31, within which the square shanks of the fingers are fitted. These socket-boxes are formed at each side with approximately spherical cavities 32, (seen in Figs. 28, 30, and 31,) whereby they are seated and adjustably supported upon correspondingly-formed shoulders 33, formed upon the shanks of screws $R^7$, which pass down through screw-threaded holes in the top of the carriage. By this construction the acting ends of the fingers are adjusted vertically, while the socket-boxes by this adjustment permit the fingers to be automatically turned. These adjustments are shown in Fig. 26, wherein is seen the socket-boxes set so as to support the fingers on a side incline, and the conical form of the screw-shoulders, upon which the socket-boxes are supported with a ball-joint seating, so that they are confined between and can be turned upon the shoulders of the screws. The semispherical cavities 32 extend about half the thickness and open at the bottom of the box and merge into semicircular cavities 34 in the upper half of the box, which exactly fit the necks 35 of the screws above their conical shoulders, while the neck of the screw terminates in a circular collar 36, which exactly fits into a semicircular recess 37 in the top of the box around the side recess 34, whereby the box is permitted to move over the screw-collar in adjusting the box on an incline. These top recesses for this purpose are made with inclined bottoms, as shown in Fig. 30, and in thus allowing the turning of the boxes the said collars also serve to give a firm support to the boxes against the upward pressure upon the fingers in moving over the last. The object of this construction is not only to adapt the fingers to different sizes of lasts, but to lasts in which the spring of the bottom varies. The fingers are firmly supported upon the screws, by which they can be independently adjusted vertically to positions higher or lower to conform to the line of the spring of the last, while each finger is by such adjustment rocked so as to tip it out of a true horizontal line from edge to edge, and thereby bring each of said fingers to a set to accommodate its under flat side to the spring of the last, and thus effect the straining and uniform laying of the edges of the upper upon and over the inner sole between the crimping-fingers, as seen in Fig. 37. In this operation these fingers are moved toward and from the last in a manner which I will now describe.

Referring to Figs. 3 and 6, the top plates of the carriages of the side-lasting fingers are seen formed on their under sides with downwardly-projecting lugs $s\ s$, between which works the upper rounded end of a rocking lever $S'$ for each carriage. These levers are mounted upon the short shafts of the brackets $Q^8$ and between the lever-arms of the side rubbers or wipers and extend downward and inwardly below said brackets and are provided at their lower ends with a roll $S^2$, which works in a slot $S^3$ in a cross-head $S^4$, which is fitted to slide vertically in guideways 38, fixed to and depending from the sides of the frame of the machine by the side of the guideways 12, as in Fig. 3. The slots $S^3$ stand in the cross-head obliquely outward, so that when the cross-head is raised its connected levers will be operated to carry the finger-carriages outward to their normal positions, as seen in Fig. 6. At a point centrally and near the top of the cross-head $S^4$ is mounted on its side a roll $S^5$, which works in a cam-groove $S^6$, (shown in Fig. 8 and in dotted lines in Fig. 6,) which is fixed upon and rotated by the cam-shaft. The descending movement of this cross-head $S^4$ will cause the carriages to move inward and carry the fingers into action to lay the edges of the upper, as stated, and to maintain them in such positions during the operation of tacking the upper to the inner sole. In this position of the lasting devices the machine is locked out of action during the tacking of the upper all around its edges to the sole between the finger crimping and laying devices by means controlled by the treadle, which I will now describe in connection with the driving-shaft.

Mounted in bearings $p\ p$ at the rear side of the machine is the driving-shaft T, having mounted upon one end, preferably the right, a loose band-wheel $T'$, whereby the power is applied to the machine. Upon this shaft is a pinion $T^2$, which gears with a wheel $T^3$, fixed on the end of the cam-shaft at the outer side of the end of the frame. Between the pinion $T^2$ and the band-wheel is a clutch $T^4$, the sliding part of which is connected to and slides with the band-wheel, and is also connected with a clutch-arm mounted in a bracket 39 on the side of the frame and having a horizontal branch 41, making a bell-crank lever, which, by means of a link 42 is coupled with a treadle U, connected to a tie-rod 43 at the rear side of the frame. On the inner face of the cam-shaft gear-wheel $T^3$ is fixed an annular rim $T^4$, having circumferential notches or shoulders 44, suitably disposed to control the several stops of the machine. A slide 45 is arranged vertically in suitable confining-guideways 46 at the inner side of the end frame, and is provided with a horizontally-projecting stop-dog 47, adapted to ride upon the circumference of the annular rim $T^4$ of the gear $T^3$, and to be forced into the notches 44 of said rim as the latter revolves. For this purpose the dog-slide 45 is connected at its lower end to the treadle by means of a screw-link 48, screwed into a swiveling stud 49, suitably mounted in the horizontal arm 41 of the clutch-lever, which is constantly pulled up by means of a spring 49, connected to the end of said arm 41 and to the frame. The object of this adjustment is to time the disengagement of the clutch with the engagement of the stop-dog, and vice versa, and it is effected by adjusting the screw-link so that the clutch and the dog will always take their proper hold. To relieve the shock caused by the action of the dog 47 in stopping the machine, a brake is brought into action at the same time the dog acts. This brake consists of a brake-wheel D on the fixed clutch part of the power-transmitting shaft and a brake-arm V, fixed upon the stud of the clutch-lever, the relation of the brake parts being such that when the stop-dog enters a notch in the gear-wheel rim the brake-arm will be instantly pressed up against the brake-wheel, and thus relieve the shock and hold the machine out of gear.

In Fig. 22 I have shown the notched rim and the notches therein as being beveled at their ends approaching the dog, so that in stopping the machine the dog will easily enter the notch, and in starting the machine the dog is withdrawn by the treadle clear of the shoulder of the notch.

The machine being at rest and all the lasting parts open, the last, with the upper and the inner sole thereon, is placed upon the heel-pin of the jack, and the operator, raising the hand-lever, operates the heel and toe carriages to bring the heel-clamp and the toe-rest in contact with the last to firmly clamp it in position during the operation. In this clamped position the parts are locked by the spring-pin of the hand-lever entering the proper hole in the gage, which is determined by the gage-stop limiting the movement of the hand-lever. During this operation the machine is locked out of power by the stop-dog. The operator then depresses the treadle, which withdraws the stop-dog, engages the clutch, and the machine starts. The cams $b^3$ and $b^4$ then act by the cam parts (shown in Fig. 3) to move the heel and toe crimping devices forward in the relation to the last shown in Fig. 11. At this moment the auxiliary side fingers are caused to close over the toe by the cams, (shown in Fig. 5,) and immediately following this movement of the auxiliary side fingers the toe-wiper is caused to rise and strain the upper, so as to mold it around the toe of the last by the edge-cam $b^2$. (Seen in Figs. 3 and 5.) Simultaneously with the action of the toe-wiper $m$ the toe-rest $g^7$ is also caused to rise, and by its compressing action upon the upper across the instep and ball of the top of the last draws the upper tightly to conform to the top of the last. As soon as the toe-rest comes in contact with the last, it is depressed by the latter for about an inch against the tension of its supporting-spring 2, until the sleeve 5 strikes the nut 6, when the toe-rest will be carried up by the cam $b^2$, so that its sides 7 will spread over the upper and strain it over the last. In this action the groove $7^2$ allows the sides 7 to open slightly as they ride up over the last, while the toe-rest tilts upon its pivot $g^8$, to allow its concave flaring end to conform to the instep of the last. During this operation the side rubbing or wiping devices (shown in Figs. 7, 18, 19, and 20) are caused to rise and strain and carry the upper up toward the bottom of the last, so as to draw the upper perfectly tight around the last by the action of the cam. (Shown in Figs. 7 and 9.) During this operation the side-lasting fingers are caused to move forward and over the bottom of the last, carrying the edges of the upper over the bottom of the last by the action of the cams and cross-head. (Shown in Figs. 6 and 8.) During this operation the heel and toe crimping devices are caused to close by a sweeping circular movement, carrying the upper over the inner sole at the heel and at the toe of the last, as seen in Figs. 12 and 37, by the action of that part of the cams $b^3 b^4$ seen in Fig. 21.

It will be understood that in the several and distinct steps of the lasting operation above stated there are no two movements that are necessarily completed together; but their operation is made continuous by the successive following of the cams during the operation of the machine, as indicated by the space between the stop-notches from $z$ to $z^2$ in Fig. 22. At this point the automatic stop device is brought into action by the stop-dog sliding into the stop-notch $z^2$ in the annular gear-rim, which stops and locks the machine out of action. The upper is now ready to be fastened to the inner sole, which may be done by tacks, as stated, or in any desired manner. After the upper is fastened, the operator then placing his foot upon the treadle starts the machine, the operation of which brings the stop-notch $z^3$ into position to be locked by the stop-dog, but during which operation the crimping-fingers are opened, as seen in Figs. 11 and 10, which gives the operator a chance to see if the edge of the upper is fully fastened at the heel and toe, after which the treadle is again depressed, which again starts the machine, which brings the stop-notch $z$ into position to be locked by the stop-dog, which brings the machine to its normal condition.

I claim—

1. In a lasting-machine, the combination, with the heel and toe clamps and their sliding carriages, and mechanism, substantially as described, for connecting said carriages for simultaneous movement toward and from the last, of a stud mounted in bearings in a fixed part of the frame and carrying a gear-wheel to operate said carriage-connecting mechanism, a hand-lever upon said stud, and means, substantially as described, for adjustably clamping said lever upon said stud.

2. In a lasting-machine, the combination, with the heel and the toe clamps, their carriages, and mechanism, substantially as described, for connecting said carriages for simultaneous movement toward and from the last, of a hand-lever for operating said mechanism, provided with a spring-actuated pin, and a fixed plate having holes graduated to half-size of lasts and provided with an adjustable stop, substantially as described.

3. In a lasting-machine, the heel and toe clamps and their sliding carriages, in combination with the rack-bars $j$ and $j'$, separately connected with said carriages, a pinion $k$, mounted in the frame between and engaging said rack-bars, a hand-lever K, secured to said pinion, and a suitable fastening for securing the handle of said lever to the frame of the machine to lock the said carriages thereto, substantially as described.

4. In a lasting-machine, the combination, with the heel and toe clamps and their sliding carriages, and mechanism, substantially as described, for connecting said carriages and giving them simultaneous movement toward and from the last, of a hand-lever connected to operate said carriage-operating mechanism, fulcrumed upon a fixed portion of the frame, and means, substantially as described, for locking said hand-lever to a graduated fixed portion of the frame, substantially as described, for the purpose specified.

5. In a lasting-machine, the combination, with the heel and toe clamps and their sliding carriages, and mechanism, substantially as described, for connecting said carriages and giving them simultaneous movement toward and from the last, of a fixed stud mounted in bearings in a fixed part of the frame, connected to operate said carriage-connecting mechanism, a hand-lever upon said stud, means, substantially as described, for locking said hand-lever to a graduated fixed portion of the frame, and means, substantially as described, for adjustably clamping said lever upon said stud.

6. In a lasting-machine, the combination of the heel and the toe clamps, their supporting-carriages, and the connected rack-bars for the latter, with the pinion $k$, engaging said rack-bars, having on its bearing-stud $k'$ a conical hub $k^2$, which terminates in a screw-threaded stem $k^3$, a hand-lever having a conical bearing conforming to the conical hub, a nut $k^6$ for clamping said lever upon its bearing, and a device for locking said hand-lever to the frame, whereby the heel and toe carriages and their clamps are adjusted to give the proper pressure upon different sizes of lasts.

7. In a lasting-machine, the combination, with the heel and toe clamps and their sliding carriages, and mechanism, substantially as described, for connecting said carriages and giving them simultaneous movement toward and from the last, of a stud $k'$, mounted in bearings in a fixed part of the frame and connected to operate said carriage-connecting mechanism, a hand-lever composed of an inner end part $k^4$ and a handle part $k^5$, and fitted with said inner end part upon said stud, means, substantially as described, for adjusting the handle part of said lever in relation to said inner end part, and a suitable fastening for holding the lever in its adjusted position, for the purpose stated.

8. In a machine for lasting shoes, the combination, with the heel and toe clamps and their supporting-carriages, and mechanism, substantially as described, for connecting said carriages and giving them simultaneous movement toward and from the last, of a hand-lever connected with and for operating said mechanism, composed of two parts $k^4$ and $k^5$, pivotally connected, the hand-actuated part $k^5$ extended beyond the said pivotal connection and the mechanism-connecting part having adjusting-screws arranged to abut against the opposite sides of the extended end of the said lever part $k^5$, and a device for locking said hand-lever to the frame, whereby to provide for an accurate adjustment of the hand-lever in relation to said locking device and to the clamping action of the heel and toe carriages.

9. In a lasting-machine, the combination, with the heel and toe clamps and their supporting-carriages, and mechanism, substantially as described, for connecting said carriages for simultaneous movement toward and from the last, of a fixed plate having graduated holes and a hand-lever having a spring-actuated pin and an adjustable connection with said connecting mechanism, substantially as described, for the purpose specified.

10. In a lasting-machine, the combination, with lasting mechanism and a cam-shaft having suitable cams for operating said mechanism, of a power-driven shaft, a gear-wheel upon said cam-shaft engaging a pinion upon said power-driven shaft and having an annular rim provided with notches or shoulders corelative to the said cams, a dog bearing against said rim and engaging said notches or shoulders, a spring-actuated treadle connected to bring said dog into and out of engagement with said notches or shoulders, and clutch mechanism connected to said treadle for stopping said power-driven shaft when the dog engages one of the notches, substantially as described.

11. In a lasting-machine, the combination of the heel and toe clamps and their sliding carriages, mechanism, substantially as described, for connecting them, and a hand-lever connecting said mechanism and provided with a device for locking the clamps to the said carriages upon the last and to the frame of the machine, with the heel and the toe crimping fingers, the side-lasting fingers, and the side rubbers or wipers, a shaft having cams connected to continuously and successively operate said lasting elements, and means, substantially as described, for automatically stopping and locking said shaft at the completion of the operative movement of said elements, substantially as described.

12. In a lasting-machine, the combination, with the heel and the toe clamps and their sliding carriages, of a pinion fixedly journaled in the main frame, a hand-lever secured to said pinion, two rack-bars respectively fixedly and pivotally connected to said carriages and engaging the upper and the lower sides of said pinion, and a guide-support arranged beneath the free end of said pivoted bar vertically below said pinion, substantially as described.

13. In a lasting-machine, the combination of the lasting mechanism, a power-transmitting shaft T, and a cam-shaft B, connected to be revolved to operate said lasting mechanism, with the gear $T^2 T^3$, connecting said shafts, the annular rim $T^4$, having three circumferential notches or shoulders 44, beveled at one end, the sliding dog 47, arranged to operate upon the circumference of said rim and in the notches thereof, a treadle 41, connected to said dog, a spring 49, for raising said treadle and dog, and a clutch device upon the power-transmitting shaft connected to said treadle, the said rim-notches being disposed to complete the operation of the lasting devices in the several separate and distinct but continuous steps, in the manner and in the order herein described.

14. In a lasting-machine, the combination of the lasting mechanism, a power-transmitting shaft, and a cam-shaft connected to be revolved to operate said lasting mechanism, with the gear connecting said shafts, the annular rim $T^4$, having three circumferential notches or shoulders 44 beveled at one end, the sliding dog 47, aranged to operate upon the circumference of said rim and in the notches thereof, a treadle connected to said dog, a spring 49 for raising said treadle and dog, a clutch device upon the power-transmitting shaft, connected to said treadle, a brake-disk D upon said power-transmitting shaft, and a brake-arm operated by said treadle, in the manner and for the purpose herein set forth.

15. In a lasting-machine, the combination, with a rigidly-supported last, laterally-swinging lever-frames, one on each side of the last, wiper-arms $Q^3$, pivotally connected therewith, standing in inclined relation toward the last and yielding at their upper ends, the rods 21, pivotally connected to said wiper-arms and extending inward therefrom, flexible straps $Q^4$, secured to the upper ends of said wiper-arms and at their lower ends to said pivoted rods, and means for both vertically reciprocating and for laterally swinging said lever-frames, substantially as described.

16. In a lasting-machine, the combination, with a rigidly-supported last, of yielding wiper-arms standing in inclined relation toward the last, means for vertically reciprocating said arms, rods pivoted to said arms, flexible straps secured to the upper ends of said arms and at their lower ends to said pivoted rods, and springs secured to said arms below said rods and to said rods, substantially as described.

17. In a lasting-machine, the combination, with a rigidly-supported last, of yielding wiper-arms standing in inclined relation toward the last, means for vertically reciprocating said arms, pivoted rod-supports upon said arms, adjustable lengthwise and yielding vertically, and flexible straps secured to the upper ends of said arms and at their lower ends to said rod-support, substantially as described.

18. In a lasting-machine, the combination, with the last, of the swinging lever-frames, each having side rubbers or wipers composed of the spring-sustained shank-strap $Q^4$, and the smaller spring-sustained toe part $Q^5$, both swinging with the lever-frame and raised by it against the upper, substantially as described.

19. In a lasting-machine, the combination, with the side wiper-straps $Q^4$, and spring-sustained pivoted back supports $Q^3$ therefor, the upper end of said strap being adjustably connected to said pivoted back support, a laterally-adjustable support 21 for the lower end of said strap, a spring 17 for stretching said strap over and upon said pivoted support 21, and a suitable frame for carrying and operating said spring-sustained pivoted back in relation to the last, substantially as described.

20. In a lasting-machine, the combination, with a rigidly-supported last and a vertically-reciprocating lever-frame pivoted at its lower end, of a wiper-arm pivoted upon said frame, a spring between said frame and arm for forcing the latter against the last, a rod pivoted to said frame at the lower end of said arm, a strap secured to the upper end of said arm and to the end of said rod, and a spring secured to said frame and to said rod, substantially as described.

21. In a lasting-machine, the side rubbers or wipers consisting of independent coacting swinging parts, a lever-frame upon which they are mounted in pairs and with which said swinging parts have spring-connection, and the said lever-frame having a cam part, in combination with a roll mounted upon the frame coacting with said lever-cam, a cross-head upon which said lever-frame is pivotally mounted, and means, substantially as described, to operate said cross-head.

22. In a lasting-machine, the side wipers consisting of a lever-frame composed of two connected arm parts Q and Q', having a cam part $Q^6$, the wiper-arms $Q^3$ and 27, loosely mounted upon the lever-frame, each having a spring and an adjustable rod-connection therewith, the wiper-strap, adjustable supports 14 and 21 therefor, and the spring 17, connecting the lower end of said strap with said lever-frame, combined with the roll $Q^7$, the cross-head $Q^2$, and its operating-cam $Q^{10}$, substantially as described.

23. In a lasting-machine, the side rubber or wiper consisting of the strap $Q^4$ and toe-rubber $Q^5$, mounted independently upon swinging supports, in combination with a pivotally-mounted frame having spring-connections with said swinging supports, and means, substantially as described, whereby said lever-frame is operated both vertically and laterally in relation to the last, substantially as described.

24. In a lasting-machine, the combination, with a rigidly-supported last and a vertically-reciprocating lever-frame, of the side wiper-strap $Q^4$, its attaching-screw part 16, the adjusting-nut 15 for the latter, the clamps 18 and 19 for the lower end of said wiper-strap, the rocking screw-rod 21 for said clamp, the adjusting-nut 23 for said rod, and the stretching-spring 17 for said wiper-strap, combined with the bar $Q^3$, having the loosely-mounted supporting-bar 22 for the screw-rod 21, substantially as described.

25. In a lasting-machine, the combination of a toe-clamp G $g'$, pivotally mounted in a fixed part $g$ of the frame, a hanging tripping-bar $g''$, pivoted upon said toe-clamp and having the lower end of said toe-clamp bearing against it, in combination with a vertically-sliding part $g^4$, having the lower end of said tripping-bar bearing against it, whereby said clamp may be locked against or released from the last, substantially as described.

26. In a lasting-machine, a toe-clamp G $g'$, pivotally mounted upon a fixed part $g$ of the frame, having a hanging tripping-bar $g''$ and an adjusting-screw $g^2$ abutting against the lower end of said tripping-bar, combined with a slide part $g^4$, and means, substantially as described, to operate said slide part, whereby the clamping action of said toe-clamp may be adjusted to suit lasts of different lengths.

27. In a lasting-machine, the toe-rest $g^7$, formed of rubber, having its upper surface grooved centrally and longitudinally, each side of such division rising therefrom and convex lengthwise and flaring at each end, in combination with a bottom holding-plate pivotally connected to the supporting-stem 1, as and for the purpose described.

28. In a lasting-machine, the toe-rest pivotally mounted upon an adjusting screw-stud, in combination with a spring-sustained support therefor, and a screw-support for the latter provided with an adjustable stop, and means, substantially as described, for raising said toe-rest, whereby the toe-rest is permitted to yield within limits and is rendered vertically adjustable, substantially as described.

29. In a lasting-machine, the combination, with the last and lasting mechanism, of the toe-rest pivotally mounted upon a screw-stud provided with adjusting-nuts, combined with a tubular support containing a spring, and a screw-stud fitting and locked within said tube upon its spring and provided with adjusting-nuts, as described, for the purpose stated.

30. In a lasting-machine, the combination, with the last and lasting mechanism, of the slide $l$, fitted in a fixed part of the frame, having mounted thereon the support for the toe-rest and the support for the toe-wiper in vertical separated relation, in combination with the toe-wiper and the toe-rest mounted upon their respective supports and operating together, and means, substantially as described, to operate them.

31. In a lasting-machine, the combination of a pivoted hanging toe-clamp G $g'$, a vertically-sliding spring-sustained toe-wiper $m$, and a pivoted toe-rest $g^7$, with means, substantially as described, for automatically and simultaneously swinging the toe-clamp toward the last and for raising the toe-wiper and toe-rest, substantially as described.

32. In a lasting-machine, the slide $l$, fitted in a fixed part of the frame, having mounted thereon the toe-wiper and the toe-rest, in combination with a toe-clamp having a tripping-bar, and a slide $g^4$, moving with said slide $l$, whereby the upward movement of said slide parts is caused to operate the toe-clamp, the toe-wiper and the toe-rest, in the way and for the purpose stated.

33. In a lasting-machine, the toe-wiper provided with a back slot $z^4$ and a projection $m'$ from its lower end, combined with a support $g^4$, having socket $m^2$, adapted to receive said projection, and having a spring-catch $m^3$, adapted to enter said slot, whereby to hold the said wiper upon its support and permit its removal and replacement by others.

34. In a lasting-machine, the combination, with the last and lasting mechanism, a toe-support, and a toe-wiper $m$, of means for supporting, operating, and adjusting the latter, consisting of the vertically-sliding back plate $g^4$, fixed guideways therefor, an adjusting screw-stud 9, an independent supporting-slide $l$, fixed guideways $l'$ for the latter, the cam $b^2$, and a spring 2, arranged to constantly exert a downward force upon said independent supporting-slide, whereby the said wiper is automatically raised and depressed in relation to the last.

35. In a lasting-machine, the combination, with the last and the simltaneously-operated heel and toe carriages D D', of a heel-clamp H, having hinged sides $h\,h$, and suitable toggle-connection therefor, and a toe-clamp, whereby the longitudinal pressure of the last upon the inner curved end of said heel-clamp operates to cause the hinged sides to press inward upon the upper on the last.

36. In a lasting-machine, the combination of the heel and toe clamps and their sliding carriage, the toe laying and crimping fingers O O $O^3$, and means, substantially such as described, for operating them, with the auxiliary side-lasting fingers P P, carried by the pivoted arms, and the cams $P^2$ $P^2$ for operating them, whereby the upper is laid upon the insole at the sides of the toe just before the crimping-fingers commence to act upon the upper around the end of the toe of the last.

37. In a lasting-machine, a heel-clamp consisting of a rigid back $h'$, having hinged sides $h$, a cushion-clamp $h^2$, secured to said hinged sides, leaving a space between it and the fixed back, the arms $h^5$, rigidly connected to said plates, the arms $h^4$, pivoted to the rear side of said cushion-clamp and to the rear ends of said arms $h^5$, and suitable supporting-connections for said rigid back and the last, whereby the endwise pressure of the latter upon the inner curved part of the said cushion causes such force to be transferred laterally to the hinged side plates $h$, through the action of the arms $h^4$ and $h^5$, to force the sides of the cushion inward upon the counters of the upper, substantially as described.

38. In a lasting-machine, the combination, with the last, of a heel-clamp composed of a cushion part $h^2$, having rigidly-connected sides $h$ $h$ and a back plate $h^3$, hinged to said side plates, but separated from said cushion part, a fixed support $h$ for said back plate, and the rods $h^4$ and $h^5$, connected to each other, to the cushion part, and to the said sides $h$ $h$, whereby the pressure of the last acting upon the cushion part forces its connected ends upon the sides of the last with a force governed by the pressure of the last, for the purpose stated.

39. A heel-clamp consisting of a back-supporting plate $h'$, side plates $h$ $h$, hinged thereto, a clamping-cushion $h^2$, fixed to the said hinged side plates, arms $h^5$, rigidly extending from said hinged side plates, arms $h^4$, pivotally connected to the back of said cushion and to the rear ends of said side arms, and a pivotally-connected support $h^6$ for said back plate, substantially as described.

40. In a machine for lasting shoes, the combination, with the last and lasting mechanism, of the side-lasting fingers, adjustable bearings for their outer ends, and the carriages by which said fingers are operated, of a socket-box for each finger, having semi-spherical side seats 32, and the supporting and adjusting screws $R^7$, each having a conical or convex swell or shoulder 33, corresponding to said box-seats, and a confining-collar 36, whereby the said boxes are supported directly upon the screws, for the purpose stated.

41. In a lasting-machine, the combination, with the last and lasting mechanism, of the boxes for the side-lasting fingers, having semi-spherical side seats 32, opening into semicircular recesses 34, and having top inclined surface recesses 37, the supporting and adjusting screws $R^7$, each having a conical or convex swell or shoulder 33, corresponding to said box-seats and terminating in a cylindrical neck 35, capped by a collar 36, the side-lasting fingers R, the adjustable bearings for their outer ends, and their operating-carriages, substantially as described.

42. In a lasting-machine, the combination, with the last and the side-lasting fingers R, of the series of socket-boxes $R^6$, the vertical screws $R^7$, and the sliding carriage $R'$, the said boxes and the said screws having co-operative curved side bearings 32 and 33, substantially as described, for the purpose specified.

43. The combination, with the side-lasting fingers and the carriages whereby they are operated, of the independent bearings for the rear ends of the fingers, provided each with a guide-stem $R^5$, passing through an opening in the carriage-top, the screw $R^4$ for supporting and adjusting said bearing, a socket-box $R^6$, fitted upon the shank of each finger, having semi-spherical side seats 32, the latter opening into semicircular side recesses 34, the supporting and adjusting screws $R^7$ for said socket-boxes, each having a conical or convex swell or shoulder 33, corresponding to said box-seats and terminating in a cylindrical neck 35, and a collar 36, capping said neck, substantially as described, for the purpose specified.

44. In a lasting-machine, the combination, with the last and lasting mechanism, of the lasting-fingers formed with square shanks, thin acting ends, and a cylindrical bearing at its shank end, the plate-bearings $R^3$, having confining-keys 30 for said finger-bearings, and guide-studs $R^5$, and the adjusting-screws $R^7$, the boxes having semi-spherical side seats 32, and the screws $R^7$ having corresponding convex bearings 33 for said box-seats, and collars 36 for confining said boxes upon their screw-shank bearings, substantially as described.

45. In a lasting-machine, the heel and the toe laying and crimping fingers and carrying-plates therefor, in combination with front supporting-posts $n$, connected to said plates by ball-joints and provided with adjusting-nuts $n'$, and supporting-rods $n^3$ for the outer ends of said plates, pivotally connected therewith and provided with hand adjusting-screws $n^5$, whereby said plates and their laying and crimping fingers are adjusted in relation to the height and also to the spring of the bottom of the last.

46. In a lasting-machine, the combination, with the last, the heel and toe carriages, and the top plates N N' thereof, of the heel and toe laying and crimping fingers O O $O^3$, carried by said top plates, the adjustable posts $n$ $n'$ for the inner ends of said top plates, and the adjustable rod $n^3$ for the outer ends of said top plates, whereby the said laying and crimping fingers may be adjusted as to their inclination in relation to the last and in their vertical relation to the last, substantially as described, for the purpose stated.

47. In a lasting-machine, the combination, with the last, of a vertically-adjustable toe-wiper $m$, a vertically-adjustable toe-rest $g^7$, the laying and crimping fingers, the top plates carrying the latter, and means, substantially as described, for adjusting said top plates both vertically and at an angle in relation to the last, for the purpose stated.

48. In a lasting-machine, the combination, with the heel and toe carriages and the top plates secured thereon, the crimping-fingers pivoted to each other, the slides $O^7$, secured in guides $O^8$ in the under sides of said top plates, the links $O^5$ and $O^6$, pivoted to said fingers and to said slides, the screw-rods $O^{10}$, pivoted to said slides, and the sliding bar $O^2$, pivoted to said fingers, means, substantially as described, for connecting said screw-rods with their respective operating-cams, and means, substantially as described, whereby the said top plates and their crimping-fingers are adjusted vertically in relation to the last.

49. In a lasting-machine, the combination, with the heel and toe carriages and the top plates $NN'$, supported thereon, of the crimping-fingers $O O$, pivoted to each other, the slide $O^7$, secured in guides $O^8$ in the under sides of said top plate, the links $O^5$ and $O^6$, pivoted to said fingers and to said slides, the screw-rods $O^{10}$, pivoted to said slides, the sliding bar $O^2$, pivoted to said fingers, and means, substantially as described, for connecting said screw-rods with their respective operating-cams, whereby to automatically operate said fingers and to adjust the crimping movement of said fingers to suit lasts having different width of heels and toes.

50. In a lasting-machine, the combination of the cushion heel-clamp having hinged side plates, means, substantially as described, for connecting and operating said hinged side plates by the lengthwise pressure of the last only upon the said cushion-clamp, side crimping pivoted fingers, and means, substantially as described, for connecting and for automatically operating them from the cam-shaft, as herein set forth.

51. In a lasting-machine, the following instrumentalities co-operating for supporting and securing and releasing the last in the operation of lasting the upper, viz: a jack, heel and toe clamps and their sliding carriages, a hand-lever, cogged gearing for connecting it with said carriages, a gage fixed to the frame with which said lever co-operates to lock the carriages when the last is clamped, a pivoted toe-rest, means, substantially as described, for clamping and releasing said pivoted toe-clamp, the slide-bar $O^2$, means, substantially as described, for raising and clamping the last against the said slide-bar, substantially as described.

52. In a lasting-machine, the following instrumentalities co-operating in the operation of lasting the upper to the inner sole, viz: a fixed last, suitable lasting mechanism, a cam-shaft having suitable cams for operating the latter, and a power-driven shaft connected with the cam-shaft, the clutch device, and a starting and stopping device consisting of the annular wheel-rim $T^4$, provided with circumferential notches or shoulders disposed in relation to the cams, as stated, the stop-dog 47, connected with an arm of the said clutch, a treadle connected with the said clutch-arm, and a spring 49, constantly acting to maintain the said stop-dog in contact with said annular rim, whereby the operation of the several lasting devices is made continuous in the order stated and the devices locked at the completion of such continuous operation.

In testimony whereof I have hereunto set my hand in the presence of two subscribing witnesses.

HENRY W. DEAN.

Witnesses:
JAMES MUNDELL,
A. E. H. JOHNSON.